US008706902B2

(12) United States Patent
Yang et al.

(10) Patent No.: US 8,706,902 B2
(45) Date of Patent: Apr. 22, 2014

(54) FEEDBACK-BASED INTERNET TRAFFIC REGULATION FOR MULTI-SERVICE GATEWAYS

(75) Inventors: Xuechen Yang, Austin, TX (US); Jian Wu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 13/032,256

(22) Filed: Feb. 22, 2011

(65) Prior Publication Data

US 2012/0215936 A1    Aug. 23, 2012

(51) Int. Cl.
*G06F 15/16* (2006.01)
*G06F 15/173* (2006.01)

(52) U.S. Cl.
USPC ............ 709/235; 709/223; 709/231; 709/232

(58) Field of Classification Search
USPC ....................................................... 709/235
See application file for complete search history.

(56) References Cited

U.S. PATENT DOCUMENTS

| | | | |
|---|---|---|---|
| 6,415,394 B1* | 7/2002 | Fruehling et al. | 714/30 |
| 6,421,790 B1* | 7/2002 | Fruehling et al. | 714/30 |
| 6,625,688 B1* | 9/2003 | Fruehling et al. | 711/109 |
| 7,215,637 B1* | 5/2007 | Ferguson et al. | 370/230.1 |
| 2002/0065907 A1* | 5/2002 | Cloonan et al. | 709/223 |
| 2007/0005804 A1* | 1/2007 | Rideout | 709/246 |
| 2007/0250635 A1* | 10/2007 | Hamilton et al. | 709/231 |
| 2009/0245248 A1* | 10/2009 | Arberg et al. | 370/390 |
| 2009/0245415 A1* | 10/2009 | Hosein | 375/295 |
| 2010/0020689 A1* | 1/2010 | Tang | 370/235 |
| 2011/0099597 A1* | 4/2011 | Boatright et al. | 725/107 |
| 2011/0126236 A1* | 5/2011 | Arrasvuori et al. | 725/46 |
| 2012/0030706 A1* | 2/2012 | Hulse et al. | 725/38 |
| 2012/0063332 A1* | 3/2012 | Hanes et al. | 370/249 |
| 2012/0192234 A1* | 7/2012 | Britt et al. | 725/58 |
| 2012/0233488 A1* | 9/2012 | Burchard et al. | 713/500 |
| 2012/0246279 A1* | 9/2012 | Zang et al. | 709/219 |

* cited by examiner

*Primary Examiner* — Richard G Keehn
(74) *Attorney, Agent, or Firm* — Merchant & Gould

(57) ABSTRACT

A method for regulating network traffic may be provided. The method may comprise: measuring usage of a CPU; determining if the CPU usage is greater than an overload threshold value; halting the increase of a data traffic shaping rate associated with traffic regulated by the CPU if the CPU usage is greater than the overload threshold value; determining if the CPU usage is greater than an overflow threshold value; and decreasing the data traffic shaping rate associated with traffic regulated by the CPU if the CPU usage is greater than the overflow threshold value for improving session setup speed.

18 Claims, 5 Drawing Sheets

FEEDBACK-BASED INTERNET TRAFFIC REGULATION FOR MULTI-SERVICE GATEWAYS

BACKGROUND

In the past decade, peer-to-peer ("P2P") applications and related content sharing software has gained popularity among Internet users. When a P2P application is started, it may spawn tens of thousands of sessions in the matter of seconds. Depending upon the particular P2P application, users may observe constant session creation and tear-down on the network. Such traffic patterns and concentrated network activity may cause various problems to Internet gateways. Problems may especially occur on residential gateways, as most P2P applications may be running of home networks. Current systems do not provide for regulating P2P traffic only when necessary without impacting the VoIP and IPTV service qualities to avoid such problems.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
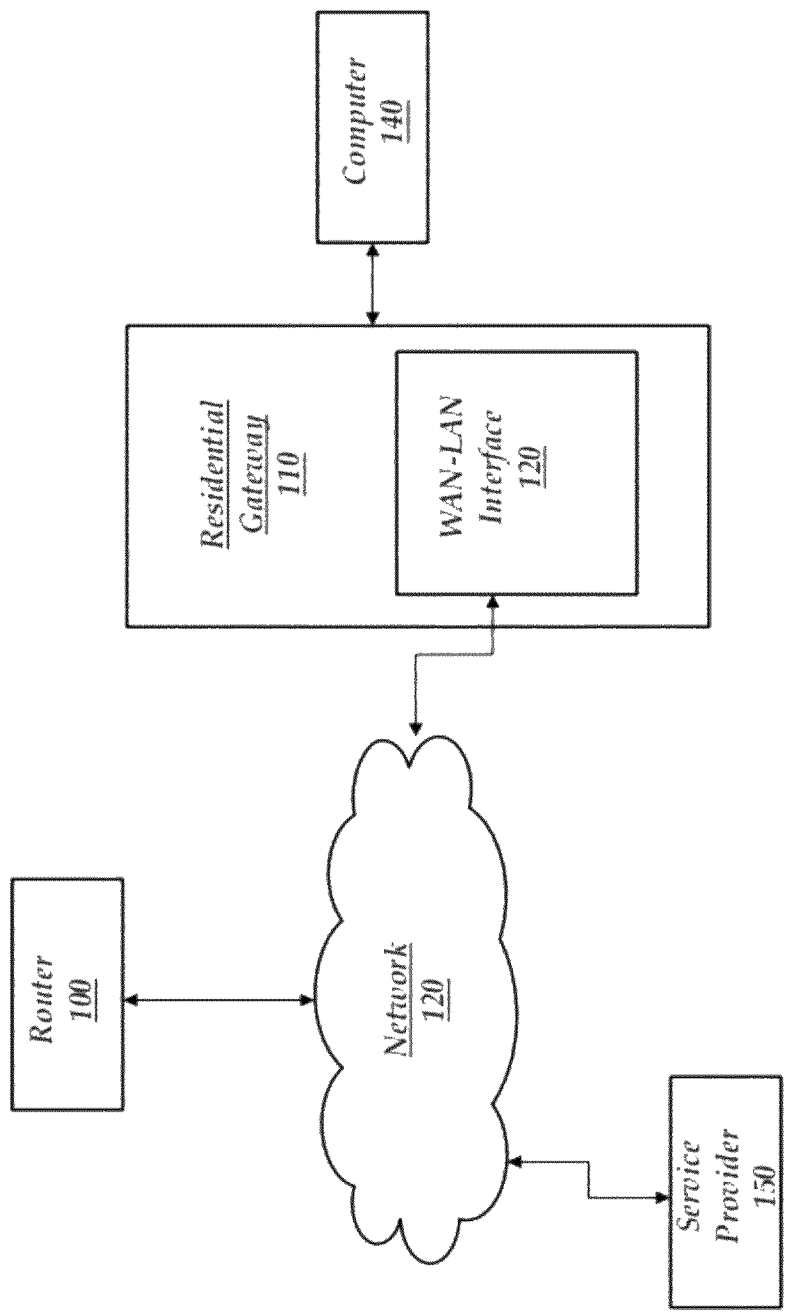
FIG. 1 is a block diagram of an operating environment.

Consistent with some embodiments, systems and methods are disclosed to optimize the regulation of data traffic on a router/gateway by monitoring CPU usage and dynamically enabling, disabling, and adjusting data traffic shaping rates in order to avoid impact to other Internet services. This mechanism may improve the overall performance of the router/gateway and equip it to better handle unusual P2P traffic patterns.

It is to be understood that both the foregoing general description and the following detailed description are examples and explanatory only, and should not be considered to restrict the application's scope, as described and claimed. Further, features and/or variations may be provided in addition to those set forth herein. For example, embodiments may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Most modern routers and/or gateways ("routing devices") may have various security and quality of service functionalities that may require session-specific processing. Internally, routers and/or gateways may create a unique data structure and determine the session-specific processing policy, processing rules, and processing instructions during the session setup stage (i.e., when the first few packets are being exchanged between the two hosts for the new protocol session). Such session setup processes may be slower than the processing for the subsequent traffic after the internal session structure has been established. The data path for session setup traffic may be referred to as the "slow path". Similarly, the data path for the subsequent traffic may be referred to as the "fast path".

When a P2P application starts, tens of thousands of Internet sessions may be created. Many of these created sessions may be accompanied by a flood of DNS query messages. Because each session setup message goes through the slow path, the CPU of the router/gateway may easily be overloaded and the processing power may be drained. To make such a matter worse, a residential gateway may perform DNS proxy functions for LAN-side DNS queries. Such proxying may slow down the router/gateway even more when a massive amount of DNS queries are simultaneously received.

As such, the P2P application, or other content sharing applications, may effectively launch unintended Denial of Service ("DoS") attacks on the router/gateway. This may result in a number of problems for the end user including: 1) losing Internet access for other applications; 2) wireless clients losing their connections to the router/gateway (if the router/gateway is operating as an access point); 3) VoIP may discontinue working; and 4) IPTV stream may freeze and become unwatchable.

To avoid these problems, embodiments may be described to efficiently regulate data shaping usage. A feedback mechanism may be employed to inform the router/gateway to when data traffic (such as traffic generated by a P2P application) needs regulation. The feedback mechanism may further specify at what rate the data traffic should be regulated to.

FIG. 1 is a block diagram illustrating an operating environment for optimizing traffic flow. A router 100 may be situated, for example, on a network path such as the Internet. Router 100 may provide IP address routing, network address translation ("NAT"), DHCP functions, firewall functions, and LAN connectivity similar to a network switch.

Router 100 may be a self-contained component, using internally-stored firmware. Router 100 may be OS-independent (i.e. can be used with any operating system). In some embodiments, router 100 may operate as a wireless router. A wireless router may perform the same functions as a non-wireless router, but also allow connectivity for wireless devices with the LAN, or between the wireless router and another wireless router. (The wireless router-wireless router connection can be within the LAN or can be between the LAN and a WAN.)

Another router device may be a residential gateway 110. Residential gateway 110 may be a home networking device, used as a gateway to connect devices in the home to the Internet or to another WAN. Residential gateway 110 may comprise a DSL modem or cable modem, a network switch, providing LAN switching, a router, and a wireless access point. Residential gateway 110 may be a triple-play routing device. A triple-play routing device may handle VoIP sessions, IPTV sessions, and data sessions (such as those created by a P2P application).

Residential gateway 110 may allow the connection of a LAN (e.g. used in the home) to a WAN via interface 130. The WAN can often be Internet 120 or can merely be a larger LAN of which the home is a part (such as a municipal WAN that provides connectivity to the residences within the municipality). WAN connectivity may be provided through DSL, cable modem, a broadband mobile phone network, or other connections.

Furthermore, a service provider 150 may be in communication with the other devices on the network. For example, service provider 150 may provide IPTV media services to residential computer 140. Residential computer 140 may comprise a set top box connected to a display device.

Figure 2:
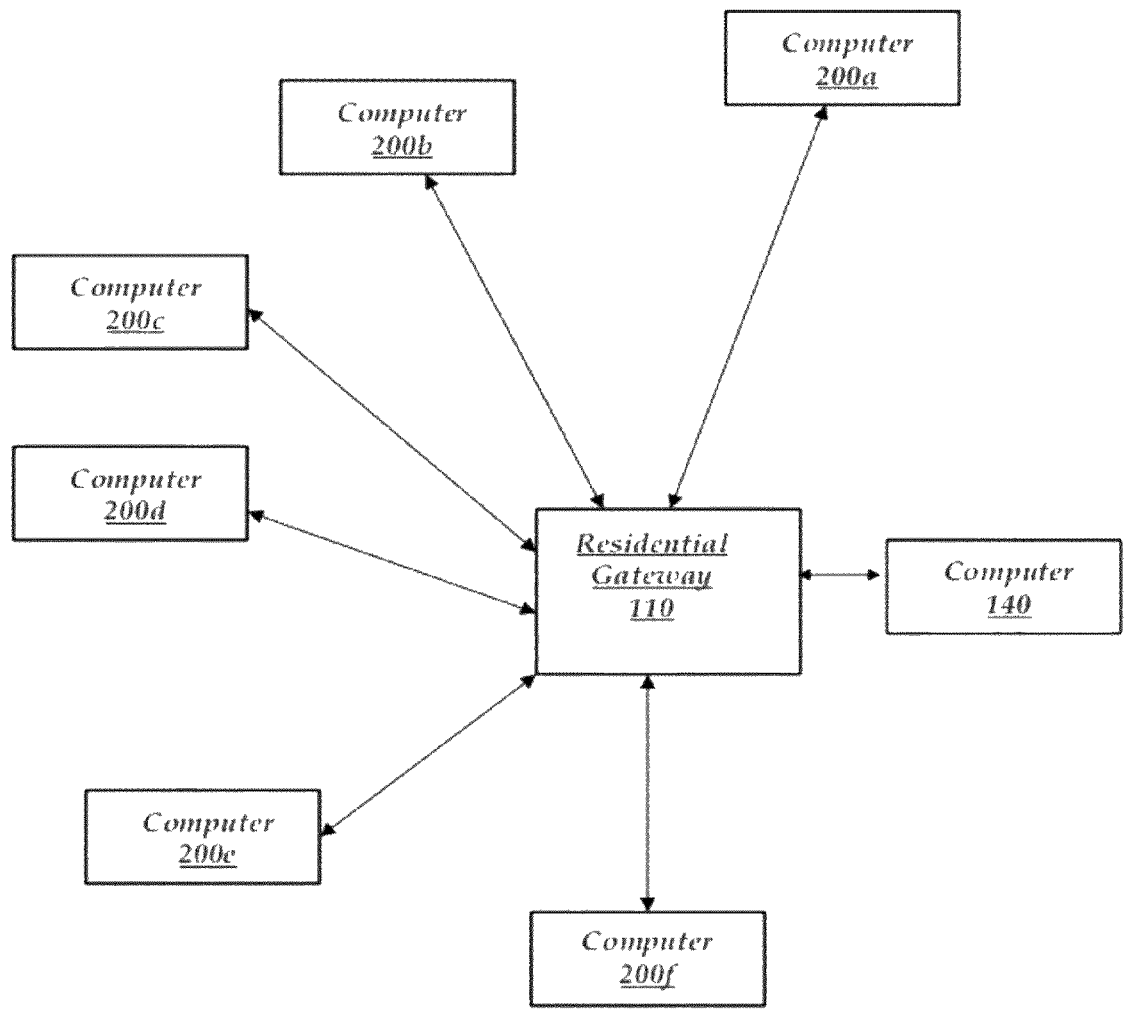
FIG. 2 is a block diagram of an operating environment.

Residential gateway 110 may further be in communication with a residential computer 140, which may be a personal computer. Residential computer 140 may be running a P2P application and establishing communications as illustrated in FIG. 2.

Residential computer 140 may be establishing a plurality of connections to a plurality of peer computers 200a-200f. Each connection may have been established through a router, such as residential gateway 110. As discussed above, many of these created sessions may be accompanied by a flood of DNS query messages. Because each session setup message goes through the slow path, the CPU of residential gateway 110 may be overloaded.

Figure 3:
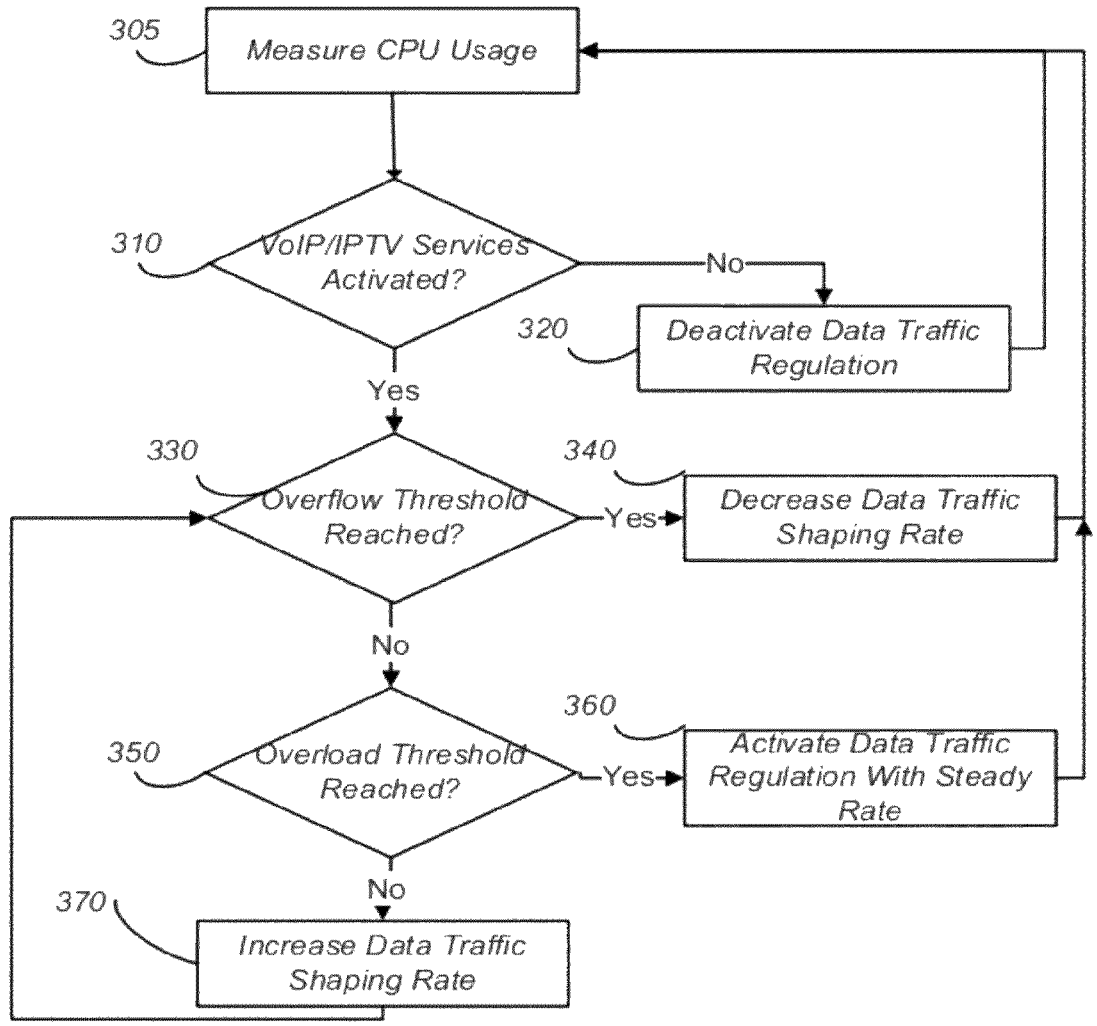
FIG. 3 is a flow chart of a method for regulating network traffic.

FIG. 3 is a flow chart setting forth the general stages involved in a method 300 consistent with embodiments for regulating data traffic, such as traffic created by a P2P application. Method 300 may be implemented using a computing device 500 as described in more detail below with respect to FIG. 5. Ways to implement the stages of method 300 will be described in greater detail below.

In a deployment of residential gateway 110, service provider 150 may guarantee the bandwidth for provided VoIP and IPTV services. This may be accomplished by using separate permanent virtual connections ("PVCs") or VLANs. An overloaded may lead to compromised VoIP and IPTV services. Monitoring CPU usage may provide a good indication as to whether data traffic needs to be regulated.

Method 300 may begin at starting block 305 wherein the CPU usage of residential gateway 110 may be measured. CPU usage may be measured as the number of busy cycles in the percentage of all available cycles. For example, 99% CPU usage may indicate that the CPU has been working non-stop during the last sampling period (e.g., 3 seconds). The sampling period may be configurable by a user or based on system conditions.

Method 300 may then proceed to stage 310 where it may be determined whether or not any VoIP or IPTV streams are currently running. There are various methods for measuring VoIP or IPTV throughput, but determining whether there is traffic may be a sufficient determination for present purposes. If there are any VoIP or IPTV streams currently running, the method may proceed to stage 330. If there are no VoIP or IPTV streams currently running, the method may proceed to stage 320 where traffic regulation may be turned off completely.

At stage 330 it may be determined if an overflow threshold value has been exceeded. The overflow threshold value may determine when the data traffic shaping rate must be adjusted and fall back to a present minimum safe value. If CPU usage reaches the overflow threshold value, the method may proceed to stage 340 where a message may be generated indicating that the device is already overloaded. Accordingly, to avoid further impact on VoIP and IPTV applications, residential gateway 110 may start shaping data traffic aggressively at a predetermined threshold value.

In some embodiments, the predetermined value may be much lower than the maximum rate supported by residential gateway 110. For example, the predetermined rate may be a runtime-determined rate. The runtime-determined rate may be one half of the previous rate.

Method 300 may then proceed to stage 350 where it may be determined if an overload threshold value has been exceeded. The overload threshold value may determine when traffic regulation should be activated. The overload threshold value may be user-configurable such that developers and customers may fine-tune the regulation algorithm. If the overload threshold value is exceeded, method 300 may proceed to stage 360.

If the overload threshold value not exceeded, method 300 may proceed to stage 370. At stage 370, the data traffic shaping rate may be increased by an incremental value and the method may return to stage 330.

At stage 360, residential gateway 110 may recognize that it is in danger of being overloaded. As a result, residential gateway 110 may begin shaping data traffic and keeping the shaping rate at the current level. Various known data traffic shaping methods may be employed. For example, a token-bucket based shaper may be employed in some embodiments. When using a token-based shaped it should be noted that queuing may be turned off to avoid dropping packets when the token bucket is full. It should be understood that there are a number of data shaping methods that may be compatible with the descriptions herein.

Figure 4:
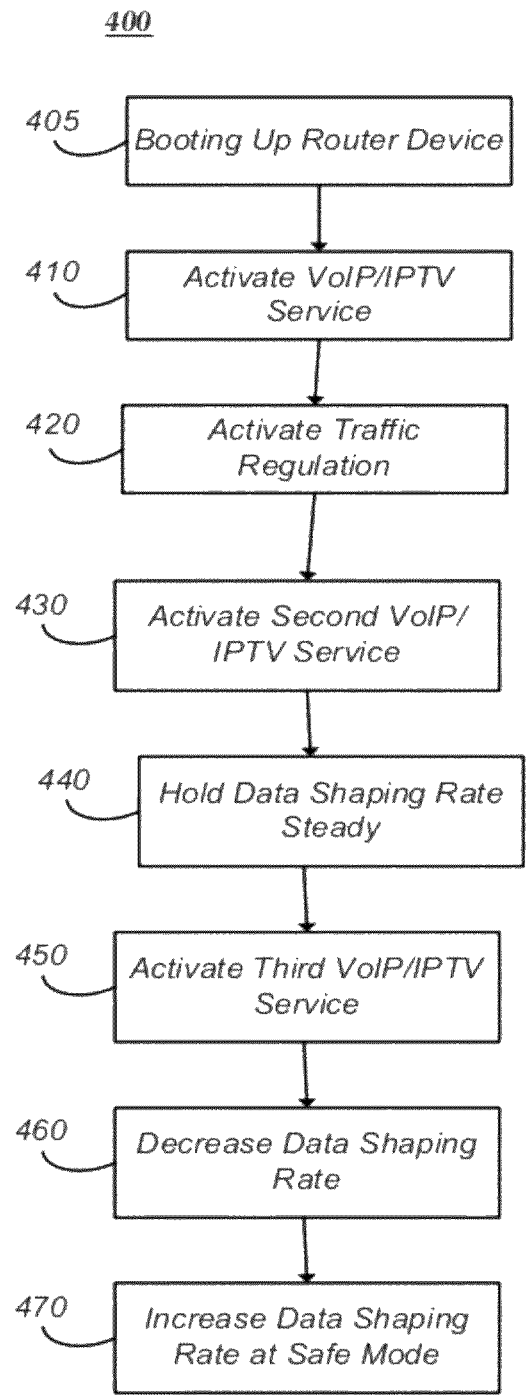
FIG. 4 is a flow chart of a method for regulating network traffic.

FIG. 4 is a flow chart setting forth the general stages involved in a method 400 consistent with embodiments for regulating traffic. Method 400 may be implemented using a computing device 500 as described in more detail below with respect to FIG. 5. Ways to implement the stages of method 400 will be described in greater detail below.

Method 400 may begin at stage 405 when a routing device is booted up. One such routing device may be router 100. Upon booting up, router 100 has data regulation functions turned off. However, router 100 may be monitoring CPU usage and VoIP/IPTV throughput. During stage 405, data traffic may consume the entirety of the bandwidth available to router 100.

Method 400 may then proceed to stage 410 where a user actives one or both of VoIP and/or IPTV services. When it is detected that such services have been activated, method 400 may proceed to stage 420 and activate traffic regulation that may have been previously discontinued. For example, traffic regulation may comprise incrementally increasing the data traffic shaping rate as the CPU usage may be below the overload threshold value.

Method 400 may then proceed to stage 430 when a user adds a second IPTV stream. For example, a user may activate a second IPTV set top box, for example at a residence. This may cause the CPU usage to exceed the overload threshold value. When this occurs, the method may proceed to stage 440 where the data traffic shaping rate is no longer increased and may be held steady.

Method 400 may then proceed to stage 450 when a user adds a third IPTV stream. This may cause the CPU usage to exceed the overflow threshold value. When this occurs, the method may proceed to stage 460 where the data traffic shaping rate is decreased. For example, the data traffic shaping rate may be halved. It should be noted that different techniques for lowering the data traffic shaping rate may be employed.

As CPU usage is now below the overload threshold value, method 400 may proceed to stage 470 where the data traffic shaping rate may be increased. The data traffic shaping rate may be increased until CPU usage again reaches the overload status and the method may return to stage 430.

If CPU usage is below the overload threshold value, residential gateway 110 may be considered to be in safe mode. While in safe mode, residential gateway 110 may have enough free CPU cycles to handle burst traffic or internal burst activity, such as the type of activity that may occur during the operation of P2P applications.

Once residential gateway 110 is in safe mode, it may discontinue data traffic shaping. Alternatively, residential gateway 110 may continue shaping data traffic while gradually increasing the shaping rate after each sampling period. For example, after falling back to the predetermined rate, residential gateway 110 may increase the shaping rate incrementally until detected CPU usage reaches the overload threshold value. When detected CPU usage reaches the overload threshold value, then the rate may be held steady. It should be understood that threshold values may vary by implementation. In the case of a triple-play gateway 70% may be used as the overload threshold value and 90% may be used as the overflow threshold value.

Above described embodiments may regulate the number of CPU cycles required for network operation and may greatly reduce the impact made while running P2P applications. This can be especially important for triple-play type of gateways/routers. It should be understood that while embodiments have been described in the context of a P2P application, embodiments may be applicable to all network protocols and activities.

Some embodiments may comprise a method for regulating network traffic. The method may comprise: measuring usage of a CPU; determining if the CPU usage is greater than an overload threshold value; halting the increase of a data traffic shaping rate associated with traffic regulated by the CPU if the CPU usage is greater than the overload threshold value; determining if the CPU usage is greater than an overflow threshold value; and decreasing the data traffic shaping rate associated with traffic regulated by the CPU if the CPU usage is greater than the overflow threshold value for improving session setup speed.

Some embodiments may comprise a system for regulating network traffic. The system may comprise a routing device comprising a CPU and a processor coupled to the routing device. The processor may be operative to: measure usage of the CPU; determine whether any VoIP or IPTV streams are running; determine if the CPU usage is greater than an overload threshold value if any VoIP or IPTV streams are running; halt the increase of a data traffic shaping rate associated with traffic regulated by the CPU if the CPU usage is greater than the overload threshold value; and increase of the data traffic shaping rate associated with traffic regulated by the CPU if the CPU usage is not greater than the overload threshold value.

Some embodiments may comprise a method for regulating network traffic on a routing device. The method may comprise: establishing a plurality of network sessions; activating a plurality of network sessions comprising VoIP traffic or IPTV traffic; monitoring CPU usage; shaping data traffic at a preset data traffic shaping rate; increasing the data traffic shaping rate for the routing device until an overload traffic threshold value is reached; holding the data traffic shaping rate for the routing device steady while data traffic is between the overload traffic threshold value and an overflow traffic threshold value; and decreasing the data traffic shaping rate for the routing device upon surpassing the overflow threshold value.

Figure 5:
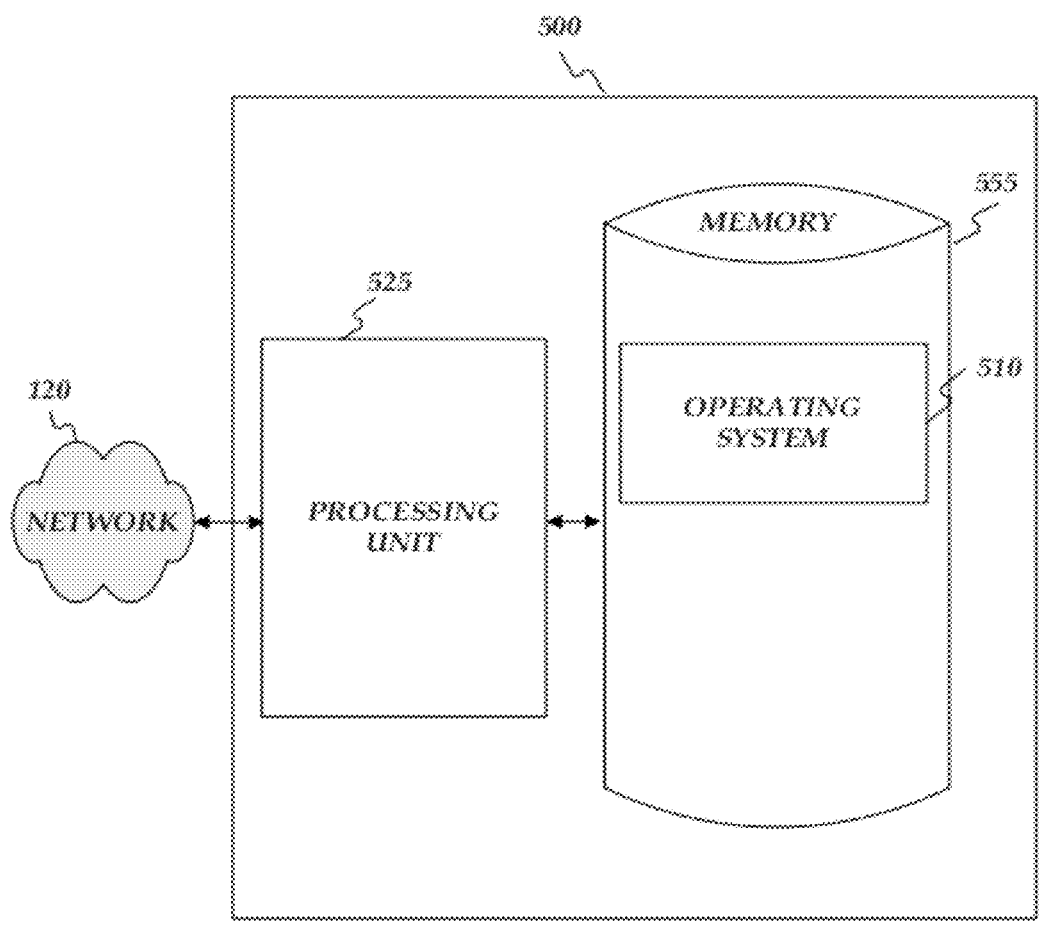
FIG. 5 is a block diagram of a computing device.

FIG. 5 illustrates a computing device 500. Computing device 500 may include processing unit 525 and memory 555. A memory 555 may comprise a dynamic random access memory (DRAM) and/or a flash memory for storing executable programs and related data components of various applications and modules for execution by router 100. Memory 555 may be coupled to processor 525 for storing configuration data and operational parameters, such as commands that are recognized by processor 525.

Memory 555 may include software configured to execute application modules such as an operating system 510. Computing device 500 may execute, for example, one or more stages included in method 300 and method 400 as described above with respect to FIGS. 3 and 4. Moreover, any one or more of the stages included in method 300 or method 400 may be performed on any router device.

Computing device 500 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Some embodiments, for example, are described above with reference to block diagrams and/or operational illustrations of methods, systems, and computer program products according to embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages.

All rights including copyrights in the code included herein are vested in and the property of the Applicant. The Applicant retains and reserves all rights in the code included herein, and grants permission to reproduce the material only in connection with reproduction of the granted patent and for no other purpose.

What is claimed is:

1. A method for regulating network traffic, the method comprising:
   establishing a plurality of peer to peer streams;
   measuring usage of a CPU as a number of busy cycles in the percentage of all available cycles for the CPU;
   determining whether one or more IPTV streams are present in addition to the plurality of peer to peer streams;

determining if the CPU usage is greater than an overload threshold value;

halting the increase of a data traffic shaping rate associated with traffic regulated by the CPU if the CPU usage is greater than the overload threshold value and if it is determined that one or more IPTV streams are present;

determining if the CPU usage is greater than an overflow threshold value;

decreasing the data traffic shaping rate associated with traffic regulated by the CPU if the CPU usage is greater than the overflow threshold value and if it is determined that one or more IPTV streams are present; and wherein data traffic shaping comprises the use of a token-bucket based shaper, wherein queuing is turned off to avoid dropping packets when a token bucket is full.

2. The method of claim 1, wherein measuring the usage of the CPU comprises determining whether any VoIP streams are running.

3. The method of claim 2, further comprising:
discontinuing data traffic shaping if it is determined that no VoIP or IPTV streams are running.

4. The method of claim 3, further comprising:
restarting data traffic shaping if it is determined that the CPU usage is greater than the overload threshold value.

5. The method of claim 1, wherein decreasing the data traffic shaping rate comprises decreasing the data traffic shaping rate to a predetermined value.

6. The method of claim 5, wherein the predetermined value is user configurable.

7. The method of claim 1, further comprising:
determining that the CPU has reached a safe mode; and
increasing the data traffic shaping rate.

8. The method of claim 7, further comprising: increasing the data traffic shaping rate incrementally after each of a plurality of CPU cycle sampling periods.

9. A system for regulating network traffic, the system comprising:
a routing device comprising a CPU;
a plurality of peer to peer streams; and
a processor coupled to the routing device, wherein the processor is operative to:
measure usage of the CPU as a number of busy cycles in the percentage of all available cycles for the CPU;
determine whether any IPTV streams are running in addition to the plurality of peer to peer streams;
determine if the CPU usage is greater than an overload threshold value if any IPTV streams are running;
halt the increase of a data traffic shaping rate associated with traffic regulated by the CPU if the CPU usage is greater than the overload threshold value and if it is determined that one or more IPTV streams are present;
increase of the data traffic shaping rate associated with traffic regulated by the CPU if the CPU usage is not greater than the overload threshold value; and wherein data traffic shaping comprises the use of a token-bucket based shaper, wherein queuing is turned off to avoid dropping packets when a token bucket is full.

10. The system of claim 9, wherein the routing device comprises a residential gateway.

11. The system of claim 10, wherein the residential gateway handles at least one of IPTV streams or VoIP streams.

12. The system of claim 11, wherein the processor is further operative to:
determine if the CPU usage is greater than an overflow threshold value; and
decrease the data traffic shaping rate associated with traffic regulated by the CPU if the CPU usage is greater than the overflow threshold value.

13. The system of claim 12, wherein the processor is further operative to:
decrease the data traffic shaping rate to a predetermined value.

14. A method for regulating network traffic on a routing device, the method comprising:
establishing a plurality of network sessions;
establishing a plurality of peer to peer streams;
activating a plurality of network sessions comprising VoIP traffic or IPTV traffic;
determining whether one or more IPTV streams are present in addition to the plurality of peer to peer streams;
monitoring CPU usage as a number of busy cycles in the percentage of all available cycles for the CPU;
shaping data traffic at a preset data traffic shaping rate;
increasing the data traffic shaping rate for the routing device until an overload traffic threshold value is reached;
holding the data traffic shaping rate for the routing device steady while data traffic is between the overload traffic threshold value and an overflow traffic threshold value;
decreasing the data traffic shaping rate for the routing device upon surpassing the overflow threshold value and upon determination that one or more IPTV streams are active; and
wherein data traffic shaping comprises the use a token-bucket based shaper, wherein queuing is turned off to avoid dropping packets when a token bucket is full.

15. The method of claim 14, wherein the plurality of new session requests are related to a P2P application.

16. The method of claim 14, wherein the routing device is a residential gateway.

17. The method of claim 16, wherein decreasing the data traffic shaping rate for the routing device upon surpassing the overflow threshold value comprises decreasing the data traffic shaping rate to a pre-determined value.

18. The method of claim 17, further comprising: setting the data traffic shaping rate to the pre-determined value upon bootup of the routing device.

* * * * *